United States Patent
Sato

(10) Patent No.: US 7,954,851 B2
(45) Date of Patent: Jun. 7, 2011

(54) INSTRUMENT PANEL AND SHIELD MEMBER

(75) Inventor: Tadashi Sato, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 100 days.

(21) Appl. No.: 12/386,797

(22) Filed: Apr. 23, 2009

(65) Prior Publication Data

US 2009/0266635 A1  Oct. 29, 2009

(30) Foreign Application Priority Data

Apr. 28, 2008  (JP) ................. 2008-117809

(51) Int. Cl.
*B60R 21/045* (2006.01)

(52) U.S. Cl. ............. 280/752; 280/775; 180/90; 296/70

(58) Field of Classification Search .......... 280/775, 280/779, 752; 180/90; 296/70, 72, 74, 1.08
See application file for complete search history.

(56) References Cited

U.S. PATENT DOCUMENTS

| | | | |
|---|---|---|---|
| 7,077,431 B2 * | 7/2006 | Gayer et al. | 280/775 |
| 7,300,072 B2 * | 11/2007 | Ercolano et al. | 280/779 |
| 7,565,940 B2 * | 7/2009 | Byrne | 180/78 |
| 7,661,710 B2 * | 2/2010 | Ikeda et al. | 280/775 |
| 2007/0296194 A1 * | 12/2007 | Ridgway et al. | 280/775 |

FOREIGN PATENT DOCUMENTS

| | | |
|---|---|---|
| JP | 58-199228 | 11/1983 |
| JP | 07-329793 | 12/1995 |
| JP | 2003-039985 | 2/2003 |
| JP | 2003-054419 | 2/2003 |
| JP | 2005-007965 | 1/2005 |
| JP | 2005-500937 | 1/2005 |
| JP | 2007-168682 A | 7/2007 |
| JP | 2008-018857 | 1/2008 |
| WO | 03/018366 | 3/2003 |

* cited by examiner

*Primary Examiner* — Paul N Dickson
*Assistant Examiner* — Nicole Verley
(74) *Attorney, Agent, or Firm* — Carrier Blackman & Associates, P.C.; William D. Blackman; Joseph P. Carrier

(57) ABSTRACT

An instrument panel is provided with: a steering column having a column cover; and an instrument panel body having an opening into which the steering column is inserted and a shield part which is disposed on an edge of the opening so as to shield a gap between the opening and the column cover, wherein the shield part protrudes from an upper edge of the opening so as to enter the column cover at a position lower than an upper portion of the column cover, and a gap between the column cover and the opening is shielded in such a manner that lower portions of side surfaces of the column cover are inserted into the opening and are disposed on the front side of the shield part in a vehicle longitudinal direction rather than a rear end thereof.

10 Claims, 11 Drawing Sheets

INSTRUMENT PANEL AND SHIELD MEMBER

BACKGROUND OF THE INVENTION

Priority is claimed on Japanese Patent Application No. 2008-117809, filed on Apr. 28, 2008, the contents of which are incorporated herein by reference.

1. Field of the Invention

The present invention relates to an instrument panel and a shield member of a vehicle.

2. Description of the Related Art

As an instrument panel of a vehicle, there is known an instrument panel including a movable mechanism such as a tilt mechanism or a telescopic mechanism, where the tilt mechanism allows a steering column to be tilted relative to an instrument panel body and the telescopic mechanism allows the steering column to move in a telescopic manner relative to the instrument panel body. Likewise, in the case where the steering column is configured to be movable relative to the instrument panel body, a gap between the instrument panel body and the steering column changes. For this reason, it is necessary to shield the changing gap. As the related art of a shielding technique, for example, Japanese Unexamined Patent Application, First Publication No. H07-329793 discloses a technique for shielding an opening in such a manner that outer walls protrude from both left and right sides of an opening of an instrument panel body and rubber boots of a steering column are provided on the inside of the outer walls. Further, for example, Japanese Unexamined Patent Application, First Publication No. 2003-54419 discloses a technique for shielding a front side of a column cover in such a manner that a flexible curtain extends from a column support and the curtain enters a portion below an upper portion of a column cover of a steering column. Furthermore, for example, Japanese Unexamined Patent Application, First Publication No. 2008-18857 discloses a technique in which a flexible shield cover is provided between an upper edge of an opening of an instrument panel body and an upper portion of a column cover.

However, in the case where the instrument panel is formed as a member separated from the shield member, an assembling process becomes complex upon attaching the shield member to the instrument panel and the steering column so as to give a good appearance. In addition, it is difficult to adjust to cover a gap between respective members. For this reason, it is necessary to realize the simpler component structure so as to further improve the quality of commodities.

An object of the present invention is to provide an instrument panel and a shield member capable of simplifying an assembling process and of improving the quality of commodities by shielding a gap between an instrument panel body and a column cover so as to have a good appearance.

SUMMARY OF THE INVENTION

In order to achieve the above-described object, according to an aspect of the invention, there is provided an instrument panel is provided with: a steering column having a column cover; and an instrument panel body having an opening into which the steering column is inserted and a shield part which is disposed on an edge of the opening so as to shield a gap between the opening and the column cover, wherein the shield part protrudes from an upper edge of the opening so as to enter the column cover at a position lower than an upper portion of the column cover, and a gap between the column cover and the opening is shielded in such a manner that lower portions of side surfaces of the column cover are inserted into the opening and are disposed on the front side of the shield part in a vehicle longitudinal direction rather than a rear end thereof.

In the instrument panel according to the present invention, the upper portion of the opening is shielded in such a manner that the shield part protruding from the upper edge of the opening of the instrument panel body enters the column cover at a position lower than the upper portion of the column cover. In addition, the lower portion of the opening is shielded in such a manner that the lower portions of the side surfaces of the column cover are inserted into the opening so as to be located on the front side of the shield part in a vehicle longitudinal direction rather than the rear end thereof in a vehicle longitudinal direction. Accordingly, since it is possible to shield a gap between the column cover and the opening of the instrument panel body so as to have a good appearance, it is possible to improve the quality of commodities. Further, since it is not necessary to combine the column cover with the instrument panel body, it is possible to shield a gap between the column cover and the opening of the instrument panel body at a low cost. Furthermore, since the shield part of the instrument panel body enters the column cover at a position lower than the upper portion of the column cover, it is possible to keep an upper space on the front side of the column cover in a vehicle longitudinal direction, and thus to improve a degree of freedom in design for the arrangement of a display, a switch, and the like.

In the instrument panel having the above-described configuration, the steering column may be installed so as to be tilted relative to the opening, and the instrument panel body may include a side shielding member which shields a gap between the opening and upper portions of the side surfaces of the column cover.

In this case, since there is provided the side shielding member which shields a gap between the opening of the instrument panel body and the upper portions of the side surfaces of the column cover, it is possible to reliably shield the upper portions of the side surfaces of the column cover by means of the side shielding member.

In the instrument panel having the above-described configuration, a protrusion length of the shield part from the opening may be set to be larger than a maximum extension length of the steering column.

In this case, since the protrusion length of the shield part from the opening is set to be larger than the maximum extension length of the steering column, it is possible to maintain the shielding state of the upper portion of the opening even when the steering column is maximally drawn out from the instrument panel body.

In the instrument panel having the above-described configuration, the shield part may include a following portion which moves together with side portions of the column cover in accordance with a tilting operation of the column cover.

In this case, since the side portions of the column cover move together with the following portion of the shield part even when a distance between the column cover and the opening of the instrument panel body changes due to a shape in accordance with the tilting operation of the column cover, it is possible to efficiently prevent a gap from being formed between the column cover and the opening.

In the instrument panel having the above-described configuration, the steering column may be installed so as to be reciprocated relative to the opening, the shield part may be formed as a member separated from the instrument panel, and wherein the shield part may be enclosed in the column cover in a case where the steering column is located at a front end in a vehicle longitudinal direction and may be exposed from the column cover in a case where the steering column is located at a rear end in a vehicle longitudinal direction.

In this case, since the shield part is enclosed in the column cover in the state where the steering column is located at the front end in a vehicle longitudinal direction even when the shield member is formed as a separate member, the shield part is not exposed unless the steering column is drawn out, and the boundary line between the shield part and the instrument panel body is not noticeable. Accordingly, it is possible to maintain the continuance of the design upon moving the steering column forward.

According to another aspect of the invention, there is provided a shield member disposed in an opening, into which a steering column is inserted, of an instrument panel body so as to shield a gap between the opening and a column cover of the steering column, the shield member is provided with: an elastic member including an upper shield portion which protrudes so as to shield an upper portion of the opening and side shield portions which are continuously formed with the upper shield portion so as to shield side portions of the opening; and a support member which sandwiches the elastic member between itself and the opening.

In the shield member according to the invention, the elastic member includes the upper shield portion which protrudes so as to shield the upper portion of the opening and the side shield portions which are continuously formed with the upper shield portion so as to shield the side portions of the opening. The elastic member is attached to the opening while being sandwiched between the support member and the instrument panel body. Accordingly, it is possible to prevent a gap from being formed in the boundary line between the elastic member and the instrument panel body. As a result, since it is possible to shield a gap between the column cover and the opening of the instrument panel body so as to have a good appearance, it is possible to improve the quality of commodities.

DETAILED DESCRIPTION OF THE INVENTION

An embodiment of the present invention will be described with reference to the accompanying drawings. In the following description, a longitudinal direction and a transverse direction correspond to a vehicle longitudinal direction and a vehicle transverse direction, respectively.

Figure 1:
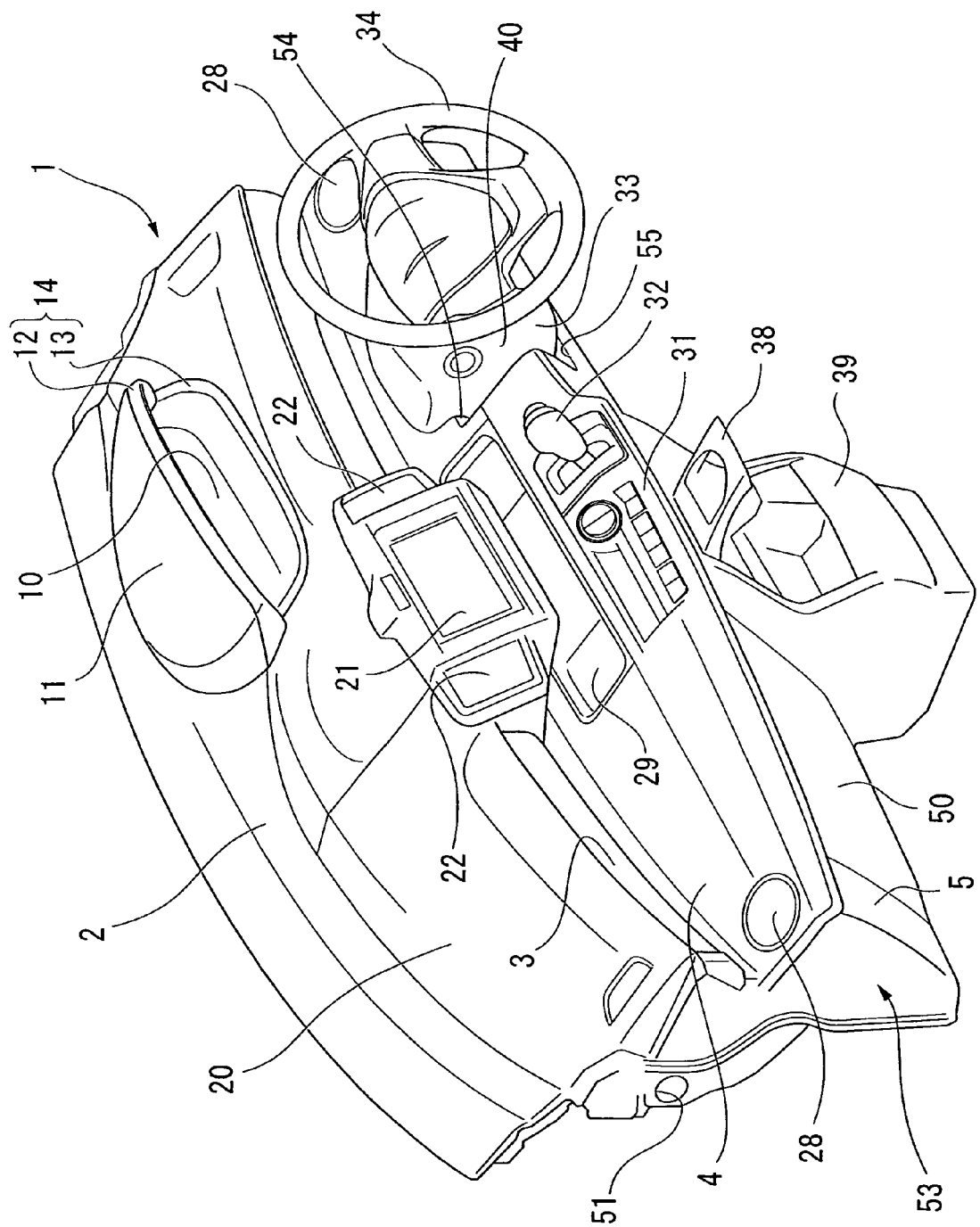
FIG. 1 is a perspective view showing an instrument panel according to an embodiment of the present invention.

FIG. 1 is a perspective view showing an instrument panel 1 disposed in the inside of a vehicle room of a vehicle. The instrument panel 1 includes an upper surface part 2; a vertical surface part 3 which extends downward from the rear edge of the upper surface part 2; a stepped upper surface part 4 which extends backward from the lower edge of the vertical surface part 3; and a front surface part 5 which extends downward from the rear edge of the stepped upper surface part 4 so as to be inclined forward.

The right side part of the upper surface part 2 of the instrument panel 1 is provided with a meter 10 which displays a vehicle speed and the like for a driver; a visor 11 which covers the upper portion of the meter 10; and a visor cover 14 which includes an upper cover 12 and a lower cover 13 disposed so as to cover the vicinity of the meter 10.

The left side part of the upper surface part 2 of the instrument panel 1 is provided with a resinous airbag lid 20 which is separated from the instrument panel 1 when a front passenger seat airbag is expanded.

An AV unit 21 is installed at the center portion in a transverse direction of the vertical surface part 3 of the instrument panel 1, and air-conditioner outlets 22 are respectively installed on both sides of the AV unit 21.

The stepped upper surface part 4 of the instrument panel 1 is provided with drink holders 28 which are respectively installed in both ends in a transverse direction and an accommodation tray 29 which is installed in the front portion at the center portion in a transverse direction. In addition, the rear part of the accommodation tray 29 of the stepped upper surface part 4 is provided with an air-conditioner manipulation unit 31 which is disposed on the left side and a shift lever 32 which is disposed on the right side. The stepped upper surface part 4 is provided with a steering wheel 34 which is installed on the right side of the shift lever 32 via a steering column 33 of which the periphery is covered by a column cover 40.

The front surface part 5 of the instrument panel 1 is provided with a drink holder 38 which is provided in the upper part at the center portion in a transverse direction and an accommodation portion 39 which is provided in the lower portion at the center portion in a transverse direction so as to extend to a floor. In addition, the front surface part 5 of the instrument panel 1 is provided with a glove box 50 which is installed on the opposite side of the steering wheel 34 in a transverse direction.

The instrument panel 1 is provided with a steering hanger beam 51 which is provided on the front side at the center portion in a vertical direction so as to extend in a transverse direction. The left and right ends of the steering hanger beam 51 are fixed to a vehicle body so as to connect the left and right front pillars (not shown) to each other, thereby attaching the instrument panel 1 to the vehicle body.

The instrument panel 1 includes a steering column 33 and an instrument panel body 53 which holds the steering column 33.

Figure 2:
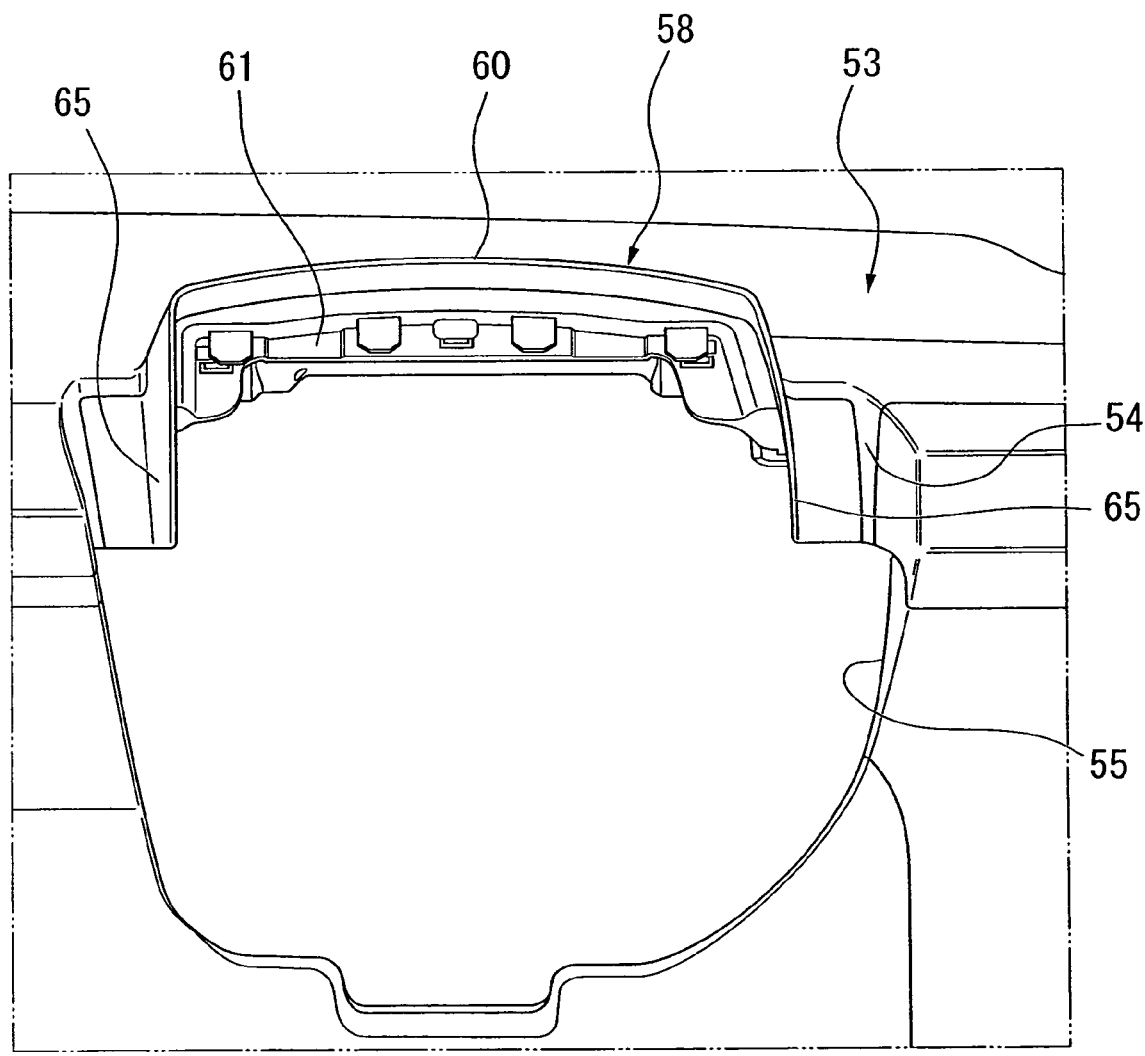
FIG. 2 is a front view showing a part in the vicinity of an opening of the instrument panel according to the embodiment.
Figure 3:
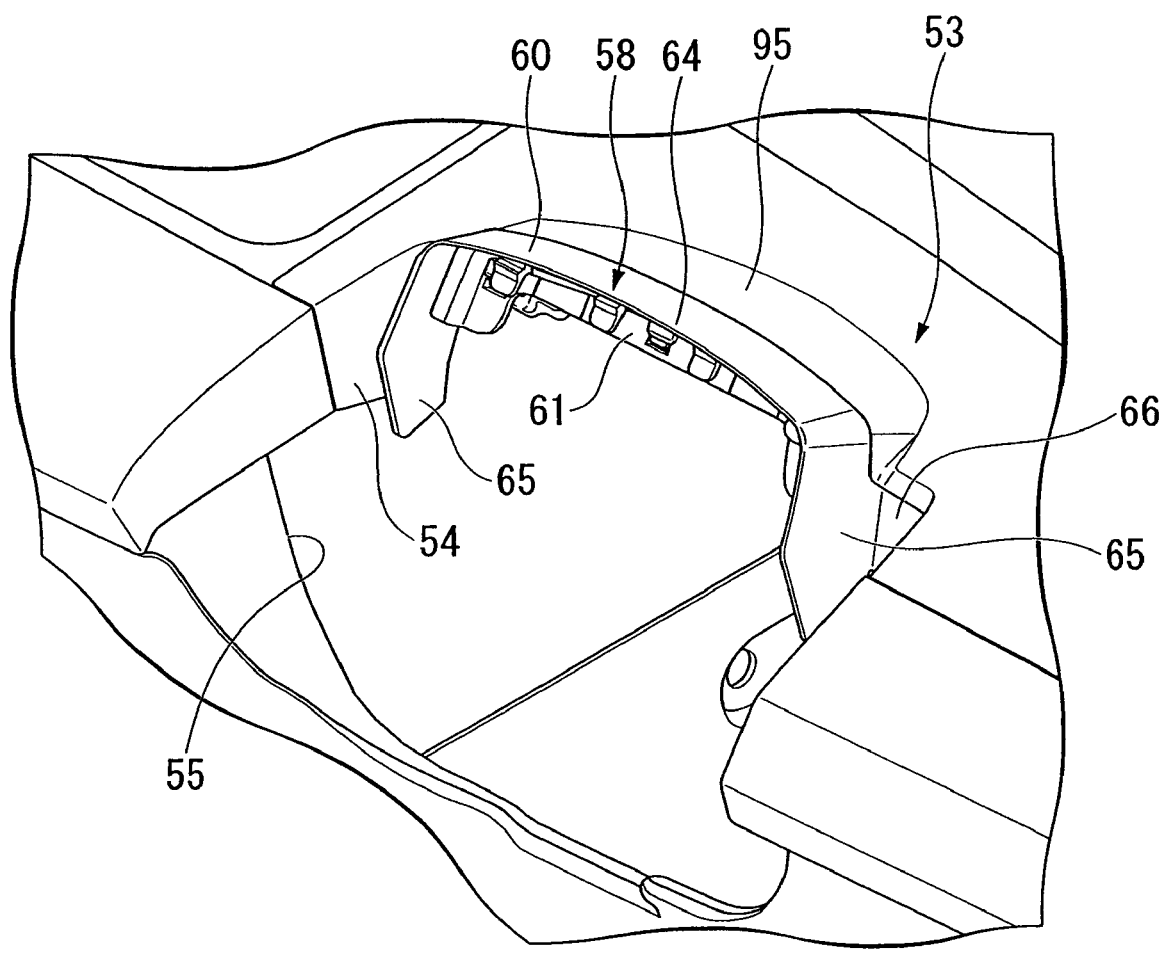
FIG. 3 is a perspective view showing a part in the vicinity of the opening of the instrument panel according to the embodiment.

The right side part of the instrument panel body 53 is provided with a concave part 54 which is formed by cutting out the stepped upper surface part 4 and the front surface part 5 so as to be concave forward. As shown in FIG. 2, the bottom side of the concave part 54 is provided with an opening 55 which is formed in a longitudinal direction so as to insert the steering column 33 therein. The instrument panel body 53 is disposed from the upper edge of the opening 55 to the left and right side edges thereof. As shown in FIG. 3, the instrument panel body 53 includes a shield member (shield part) 58 which extends backward in a protruding manner.

The shield member 58 is formed as a member separated from the base member forming the concave part 54 and the like of the instrument panel body 53. In detail, the shield member 58 shields a gap between the opening 55 and the column cover 40. The shield member 58 includes a shield body (elastic member) 60 which is integrally formed of a soft elastic material such as a thermoplastic olefin-based (TPO) resin and a support member 61 which is integrally formed of a rigid material such as a polypropylene (PP) resin.

Figure 4:
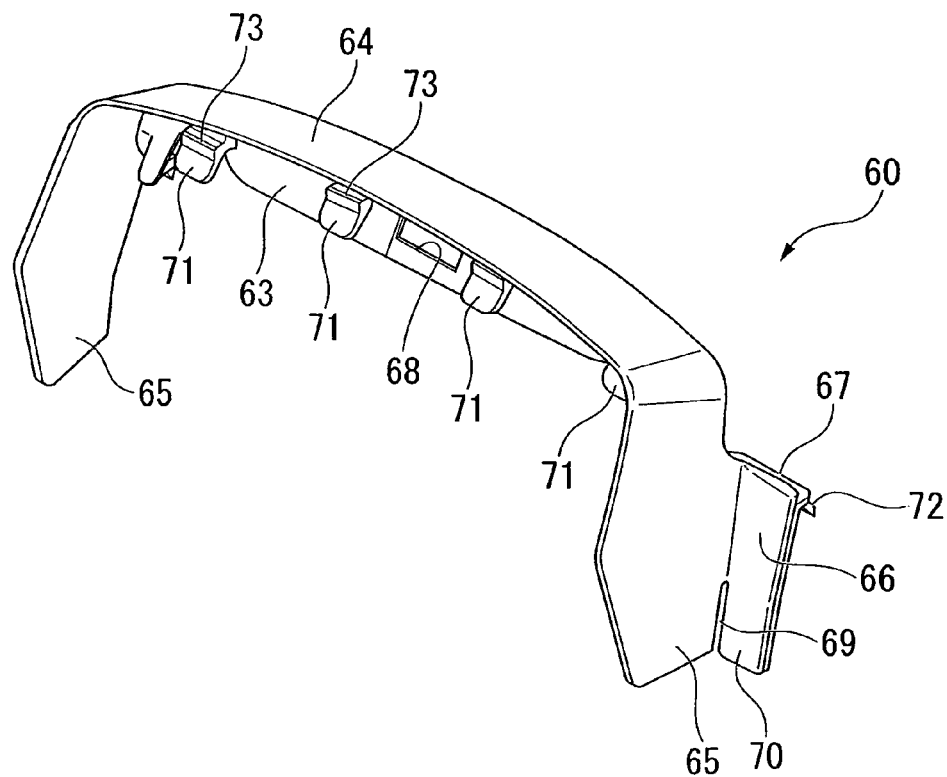
FIG. 4 is a perspective view showing a shield body of the instrument panel according to the embodiment.
Figure 5:
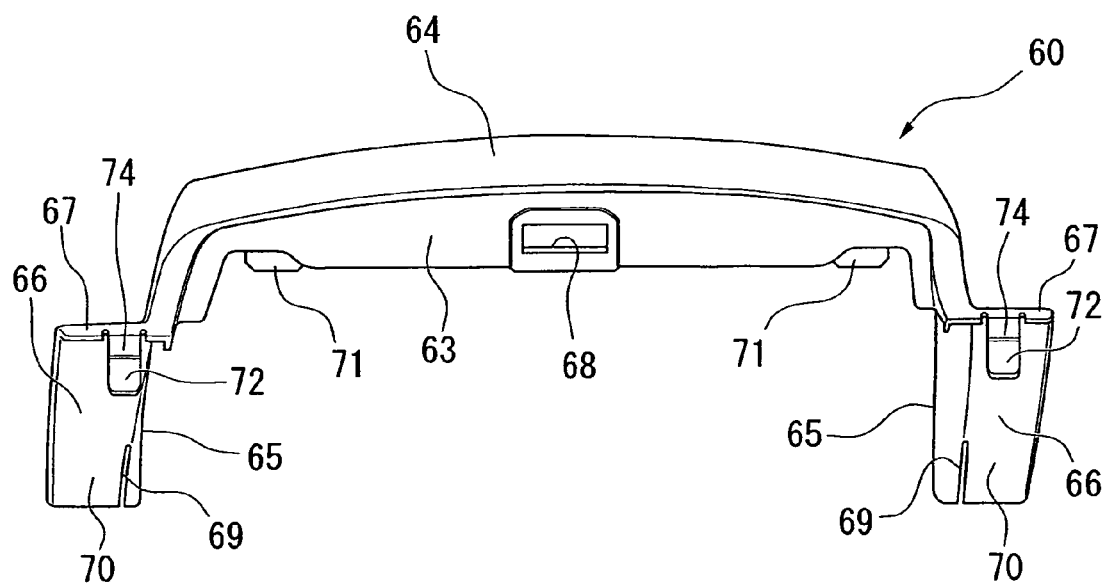
FIG. 5 is a rear view showing the shield body of the instrument panel according to the embodiment.

As shown in FIGS. 4 and 5, the shield body 60 includes a base plate portion 63 which is long in a transverse direction; an upper plate portion (upper shield portion) 64 which extends backward from the upper edge of the base plate portion 63; a pair of side plate portions (side shield portion and side shielding means) 65 which is continuous to the upper plate portion 64 and extends downward while being connected from the left and right edges of the upper plate portion 64 to the left and right edges of the base plate portion 63; a pair of extension plate portions 66, each of which is formed in the center and lower portions of the front edge of each side plate portion 65 so as to extend outward in a direction parallel to the base plate portion 63; and a protrusion plate portion 67 which slightly protrudes forward from the upper edge of each extension plate portion 66. The center portion in a transverse direction of the base plate portion 63 is provided with an engagement hole 68 which is formed in a longitudinal direction. The lower portion of the boundary between each side plate portion 65 and each extension plate portion 66 which are adjacent to each other is provided with a slit 69 which is formed downward. The lower portion of the extension plate portion 66 is formed as an easily deformable swing plate portion (following portion) 70 by means of the slit 69.

The shield body 60 is provided with plural engagement piece portions 71 which are provided in a transverse direction at a predetermined interval therebetween so as to extend downward from the upper plate portion 64 of the rear surface of the base plate portion 63. In addition, the shield body 60 is provided with a pair of engagement piece portions 72, each of which extends from each front edge of the left and right protrusion plate portions 67 so as to be inclined forward. The center portion of each engagement piece portion 71 is provided with an engagement portion 73 which is thicker than both side portions thereof, and the center portion of each engagement piece portion 72 is provided with an engagement portion 74 which is thicker than both side portions thereof.

Figure 6:
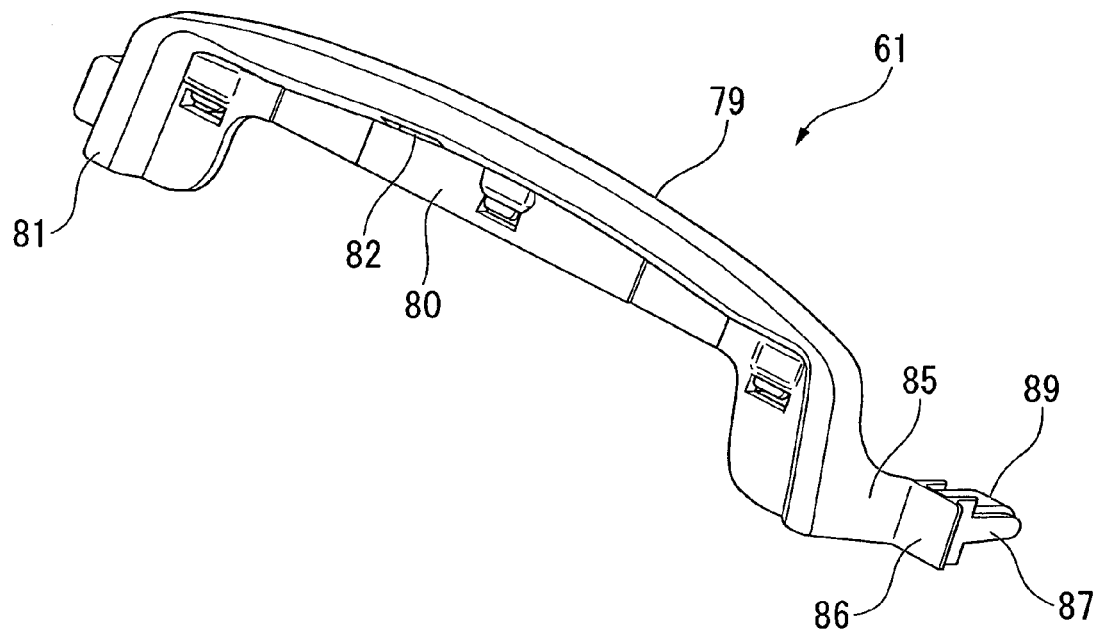
FIG. 6 is a perspective view showing a support member of the instrument panel according to the embodiment.
Figure 7:
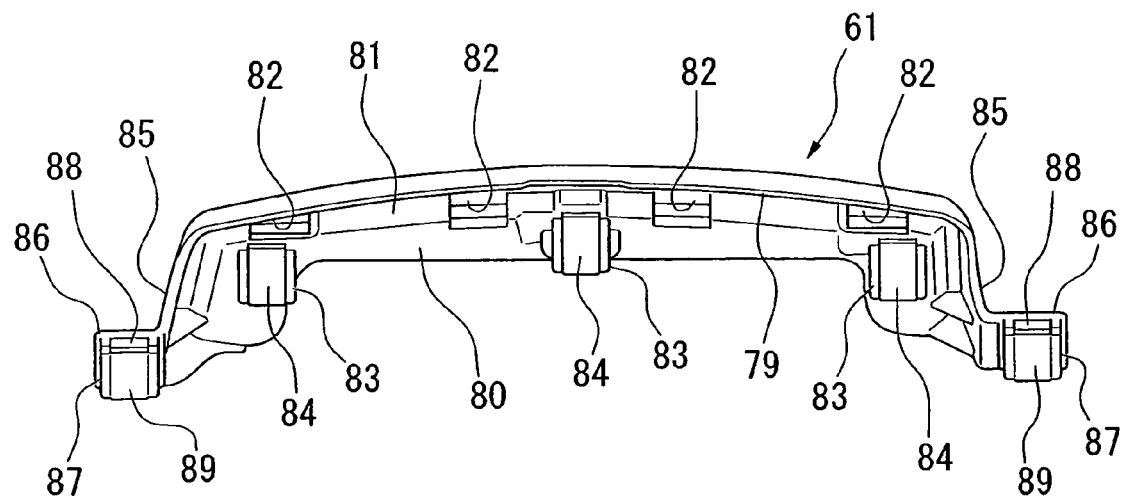
FIG. 7 is a rear view showing the support member of the instrument panel according to the embodiment.

As shown in FIGS. 6 and 7, the support member 61 includes a base plate portion 80 which is long in a transverse direction; a stepped portion 81 which protrudes backward from the upper edge and the left and right edges of the base plate portion 80 so as to have a stepped shape; and an outer edge protrusion portion 79 which protrudes from the upper edge and the left and right side edges of the stepped portion 81 more than the base plate portion 80 in a direction toward the base plate portion 80. The edge of the stepped portion 81 on the side of the base plate portion 80 is provided with an engagement hole 82 which is formed in a vertical direction. Here, the base plate portion 80 is provided with clip holding portions 83 which are formed at the center portion and the left and right portions thereof so as to extend forward, and each clip holding portion 83 is attached with a resinous clip 84.

The support member 61 includes a pair of front extension portions 85, each of which extends forward from each front edge of the base plate portion 80 on the left and right sides of the outer edge protrusion portion 79; a pair of side extension portions 86, each of which extends outward in a transverse direction from the front edge of each front extension portion 85; and a pair of clip holding portions 87, each of which extends forward from each side extension portion 86. The base end of each clip holding portion 87 is provided with an engagement hole 88 which is formed in a vertical direction, and a resinous clip 89 is attached to the front end of the clip holding portion 87 rather than the engagement hole 88.

Figure 8:
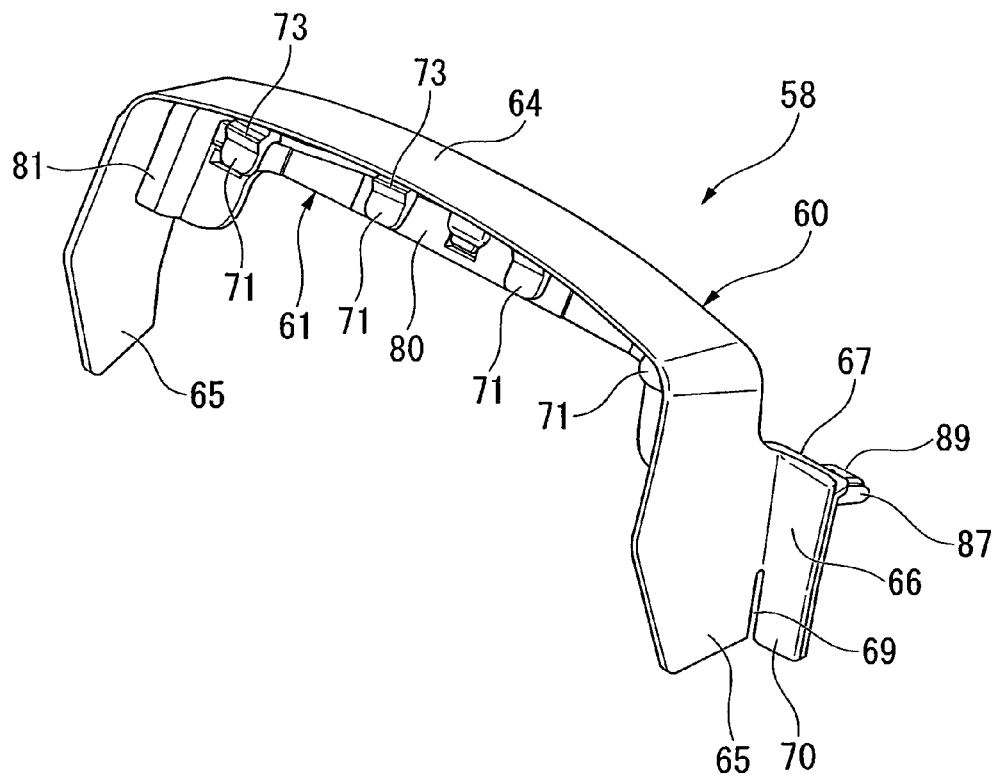
FIG. 8 is a perspective view showing a shield member of the instrument panel according to the embodiment.
Figure 9:
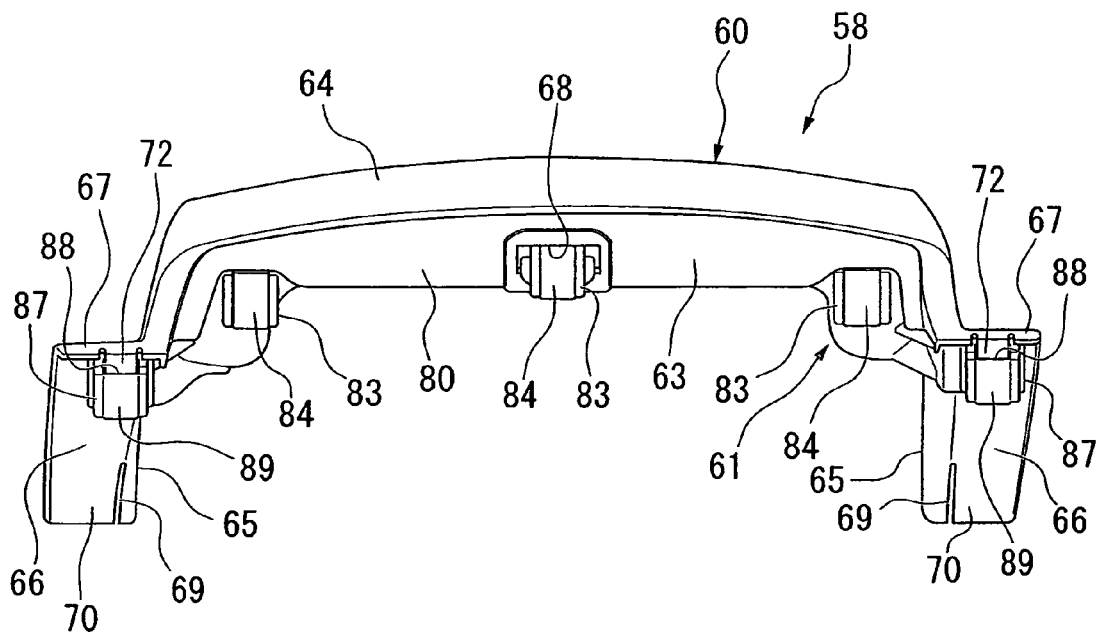
FIG. 9 is a rear view showing the shield member of the instrument panel according to the embodiment.

As shown in FIGS. 8 and 9, the support member 61 is attached to the shield body 60. At this time, the outer edge protrusion portion 79 of the support member 61 comes into contact with the rear surface of the base plate portion 63 of the shield body 60. The front extension portion 85 and the outer edge protrusion portion 79 of the support member 61 come into contact with the inner surfaces of both side plate portions 65 and the lower surface of the upper plate portion 64 of the shield body 60. The side extension portion 86 of the support member 61 comes into contact with the front surface of the extension plate portion 66 of the shield body 60. In addition, at this time, the resinous clip 84 of the center portion of the support member 61 is inserted into the engagement hole 68 of the base plate portion 63 of the shield body 60. Further, each engagement piece portion 71 of the base plate portion 63 of the shield body 60 engages with each engagement hole 82 of the stepped portion 81 of the support member 61 until the thick engagement portion 73 passes over the engagement hole 82. Furthermore, each engagement piece portion 72 on the left and right ends of the shield body 60 engages with each engagement hole 88 of the clip holding portions 87 on the left and right ends of the support member 61 until the thick engagement portion 74 passes over the engagement hole 88.

With such a configuration, the shield body 60 and the support member 61 are incorporated into each other to thereby form the shield member 58.

Figure 10:
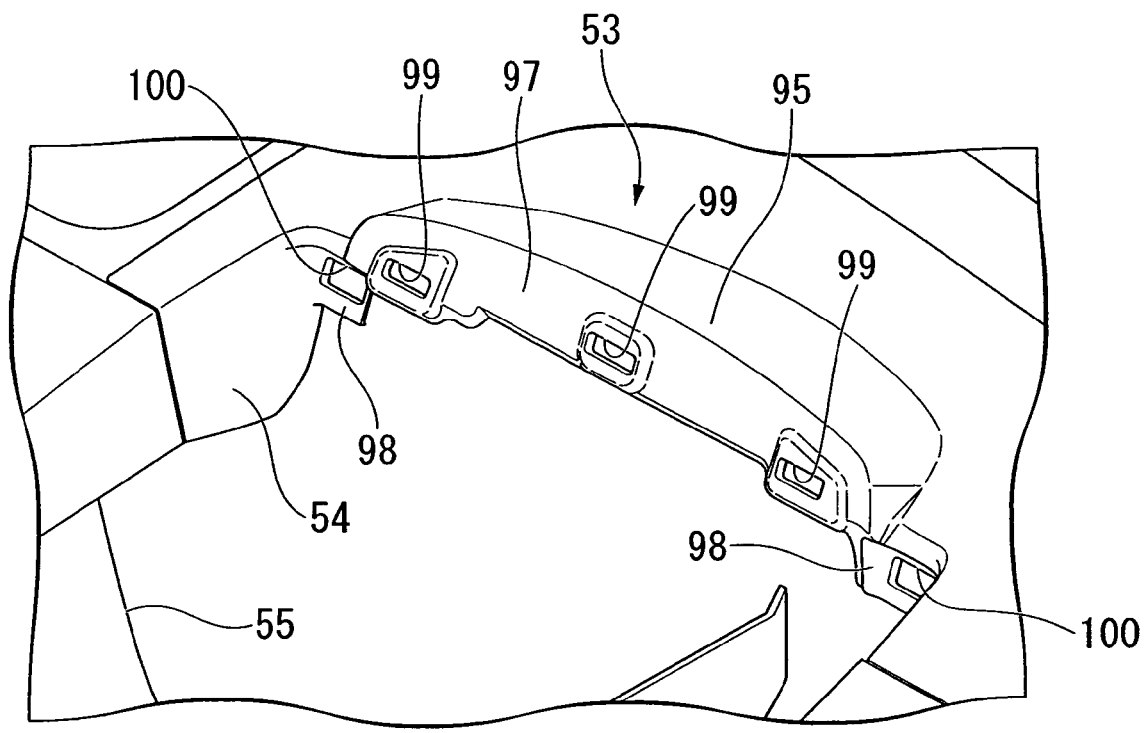
FIG. 10 is a perspective view showing a part in the vicinity of the instrument panel according to the embodiment before the shield member is attached to the opening.

As shown in FIG. 10, the instrument panel body 53 is provided with a swollen portion 95 which is formed in front of the concave part 54 so as to be swollen upward in a circular arc shape. The bottom portion of the concave part 54 forming the upper edge of the opening 55 is provided with a main portion 97 which is located at the swollen portion 95 and a pair of stepped portions 98 which is formed at both left and right sides of the main portion 97 so as to be deviated downward relative to the main portion 97 and to be recessed forward in a stepped shape. The main portion 97 is provided with plural engagement holes 99 which are formed in a longitudinal direction so as to have an interval in a transverse direction.

Each of the pair of stepped portions 98 is provided with an engagement hole 100 which is formed in a longitudinal direction.

Each resinous clip 84 engages with each engagement hole 99 formed in the main portion 97, and each resinous clip 89 engages with each engagement hole 100 formed in each of the pair of stepped portions 98, thereby attaching the shield member 58 to the concave part 54 of the instrument panel body 53 as shown in FIGS. 2 and 3.

In the state where the shield member 58 is attached to the instrument panel body 53, as shown in FIG. 3, the upper surface of the upper plate portion 64 of the shield body 60 is continuous to the upper surface of the swollen portion 95 of the instrument panel body 53, and the outer surface of the side plate portion 65 of the shield body 60 is continuous to the outer surface of the swollen portion 95, thereby covering the stepped portion 98 by means of the extension plate portion 66 of the shield body 60.

Figure 11:
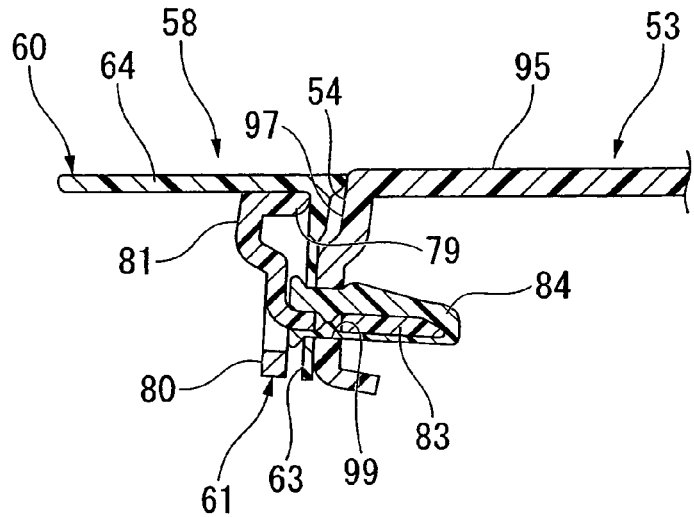
FIG. 11 is a sectional view showing the state where the shield member is attached to the instrument panel according to the embodiment.

In the state where the shield member 58 is attached to the instrument panel body 53, in the shield member 58, as shown in FIG. 11, the front edge of the outer edge protrusion portion 79 of the support member 61 presses the base plate portion 63 of the shield body 60 against the main portion 97 of the instrument panel body 53. In other words, the base plate portion 63 of the shield body 60 is sandwiched between the front edge of the outer edge protrusion portion 79 of the support member 61 and the bottom portion of the concave part 54 of the instrument panel body 53.

Figure 12:
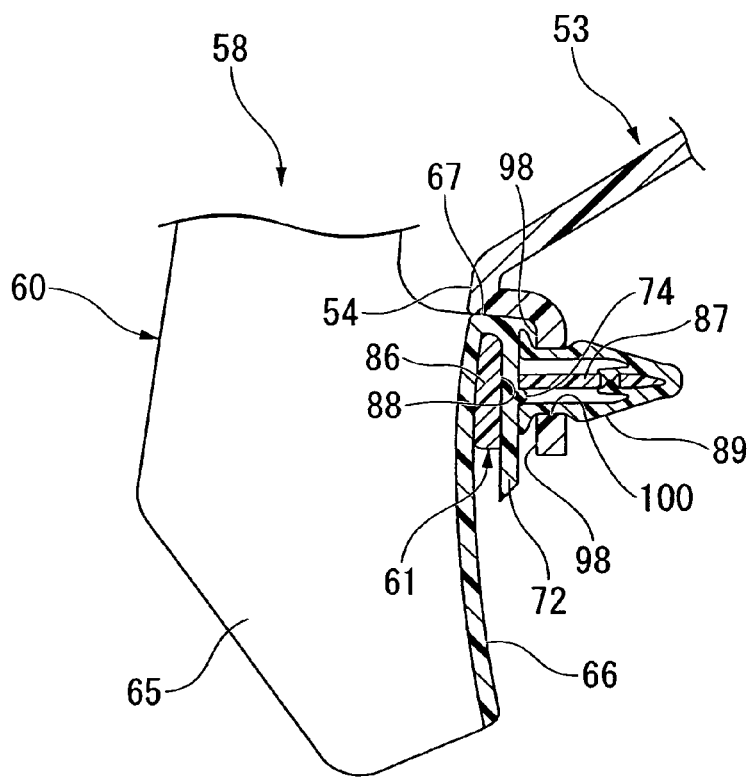
FIG. 12 is a sectional view showing the state where the shield member is attached to the instrument panel according to the embodiment.

In the state where the shield member 58 is attached to the instrument panel body 53, in the shield member 58, as shown in FIG. 12, the upper edge of the side extension portion 86 of the support member 61 presses the protrusion plate portion 67 of the shield body 60 against the stepped surface facing the lower portion of the stepped portion 98 of the instrument panel body 53. In other words, the protrusion plate portion 67 of the shield body 60 is sandwiched between the upper edge of the side extension portion 86 of the support member 61 and the stepped portion 98 of the concave part 54 of the instrument panel body 53.

Figure 13:
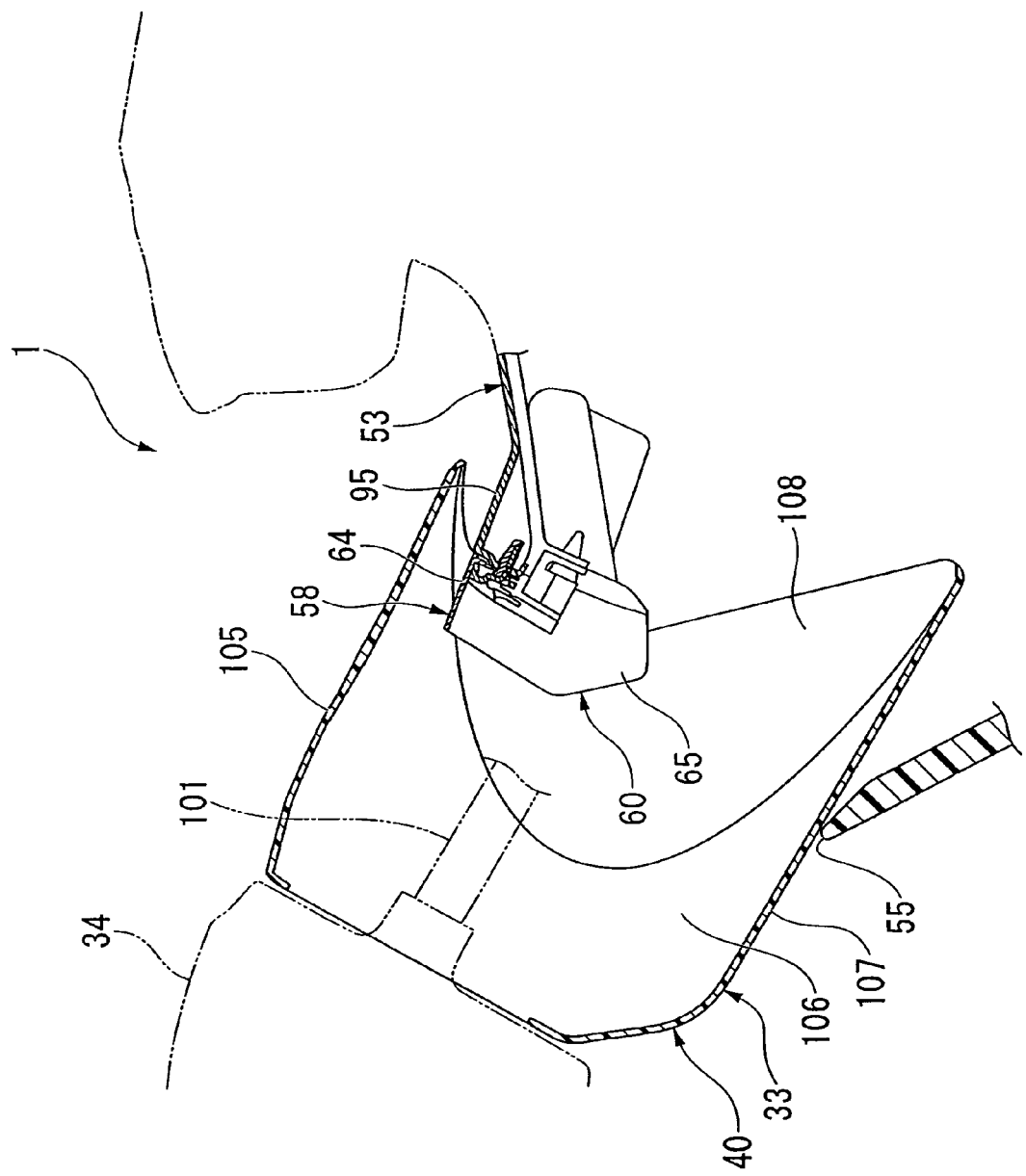
FIG. 13 is a sectional view showing the instrument panel according to the embodiment.

With such a configuration, the shield body 60 is sandwiched between the support member 61 and the opening 55. In this state, as shown in FIG. 13, the upper plate portion 64 forming the upper surface of the shield body 60 protrudes backward, and the side plate portion 65 forming the outer side surfaces of the shield body 60 in a transverse direction protrudes backward in a vertical direction.

The steering wheel 34 is supported by a steering shaft 101. The steering column 33 includes the column cover 40 which covers the vicinity of the steering shaft 101. The column cover 40 is formed in a substantially cylindrical shape provided with an upper plate portion 105 which forms the upper surface; a pair of side plate portions 106 which extend downward from both left and right edges of the upper plate portion 105 so as to form the side surfaces; and a lower plate portion 107 which is connected to the lower edges of the side plate portions 106 so as to form the lower surface.

Figure 14:
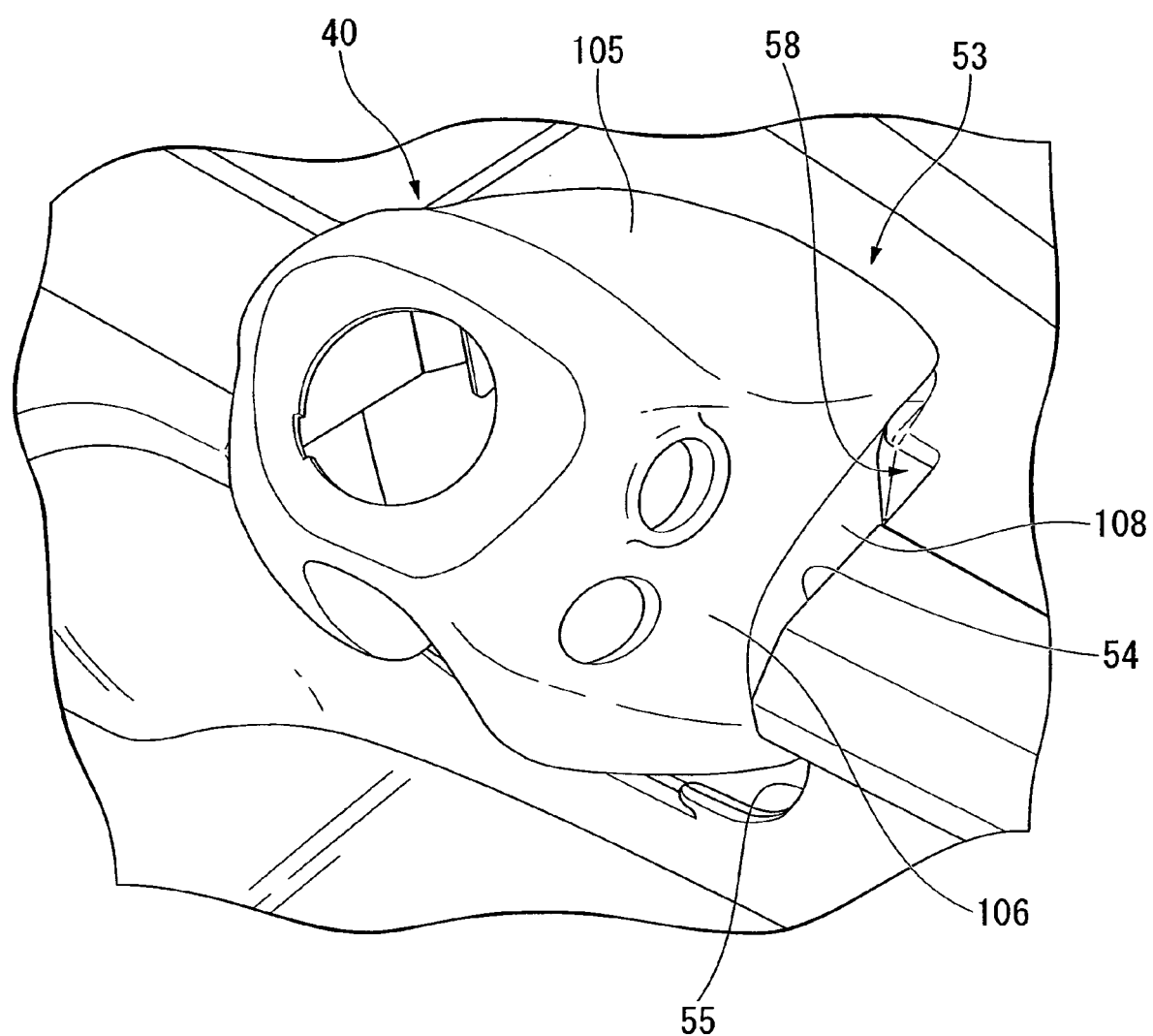
FIG. 14 is a perspective view showing the state where a column cover is disposed in the vicinity of the opening of the instrument panel according to the embodiment.

Here, as shown in FIG. 14, the pair of side plate portions 106 is provided with a stepped portion 108 which is formed in the lower front portion so as to have an inward stepped shape in a transverse direction and to extend forward. The column cover 40 is inserted into the bottom-side opening 55 so that the left and right stepped portions 108 are disposed in the concave part 54 of the instrument panel body 53. As shown in FIG. 13, the front-edge-side lower portions, which are closer to the bottom, of the left and right stepped portions 108 protrude so as to be located on the opposite side of the steering wheel 34 in an axial direction of the steering shaft 101. In addition, although it is not shown in the drawing, the steering column 33 is provided with a telescopic mechanism which is used to adjust the steering wheel 34 in an axial direction and a tilt mechanism which is used to adjust a tilt angle of the steering wheel 34 in a vertical direction relative to the instrument panel body 53. When the mechanisms are used to make adjustments, the column cover 40 moves together with the steering wheel 34.

As shown in FIGS. 2 and 3, the stepped portions 108 of the column cover 40 are inserted into a gap between the opposed side surfaces of the concave part 54 of the instrument panel body 53 and the opposed side plate portions 65 of the shield body 60 of the shield member 58. In addition, as shown in FIG. 13, the upper plate portion 105 is disposed so as to cover the upper plate portion 64 of the shield body 60 of the shield member 58 and the swollen portion 95 of the instrument panel body 53 from the upside thereof while having a gap relative to the upper plate portion 64 and the swollen portion 95. In other words, the shield body 60 of the shield member 58 protrudes from the upper edge of the opening 55 toward the column cover 40 so as to enter the column cover 40 at a position lower than the upper plate portion 105 of the column cover 40. As a result, the shield body 60 of the shield member 58 shields a gap between the upper portion of the opening 55 and the column cover 40. In addition, the shield body 60 of the shield member 58 shields a gap between the upper portion of the side surface of the column cover 40 and the side portion of the opening 55 in the side plate portion 65.

The column cover 40 is disposed so that the upper plate portion 105 is always located on the front side of the upper plate portion 64 of the shield member 58 in a longitudinal direction rather than the rear end thereof in a longitudinal direction. That is, a protrusion amount of the shield member 58 from the opening 55 is set to be larger than a maximum extension distance of the steering column 33. In addition, the column cover 40 is disposed so that the lower portion of the side plate portion 106 is inserted into the opening 55 and the lower portion of the side plate portion 106 is always located on the front side of the shield member 58 in a longitudinal direction rather than the rear end thereof in a longitudinal direction.

In other words, the upper plate portion 105 of the column cover 40 has a predetermined dimensional relationship with the upper plate portion 64 of the shield body 60 of the shield member 58 so as to always wrap the upper plate portion 64 in an axial direction of the steering shaft 101. The both side plate portions 106 of the column cover 40 have a predetermined dimensional relationship with both side plate portions 65 of the shield body 60 of the shield member 58 so as to always wrap both side plate portions 65 in an axial direction of the steering shaft 101.

Figure 15:
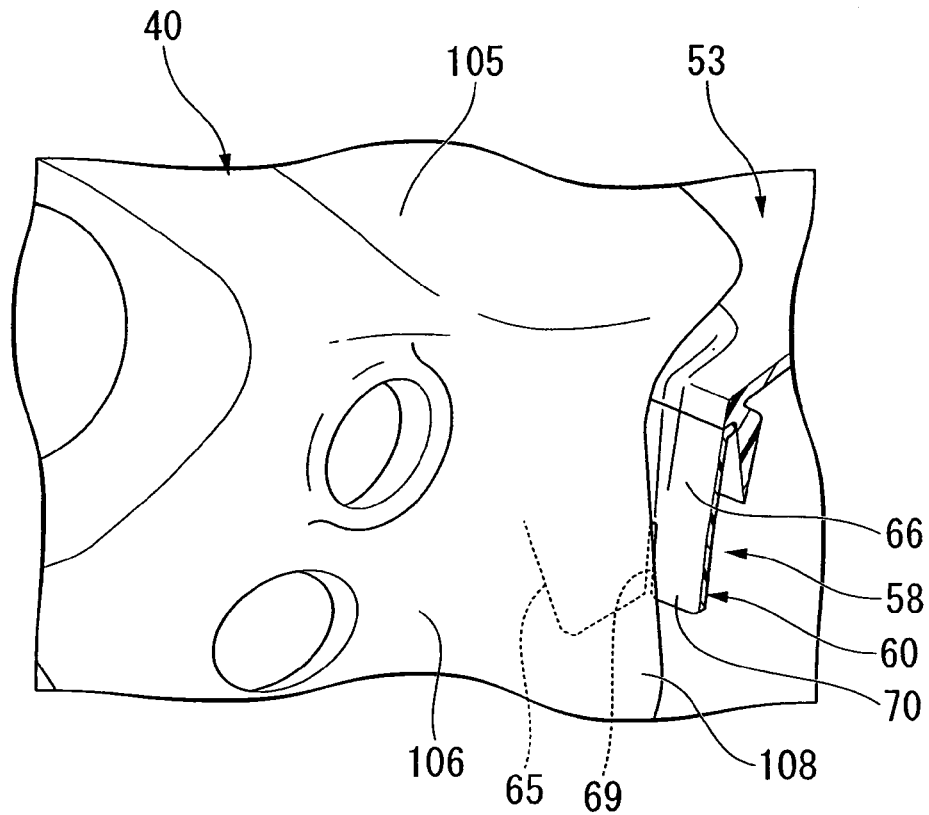
FIG. 15 is a partially perspective view showing a relationship between the column cover and the shield member of the instrument panel according to the embodiment.
Figure 16:
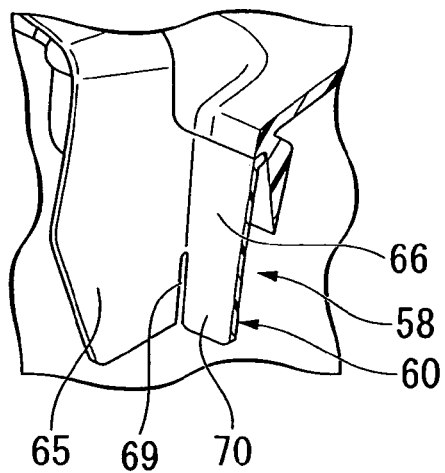
FIG. 16 is a partially perspective view showing the shield member of the instrument panel according to the embodiment.

The lower portions of the stepped portions 108 of both side plate portions 106 of the column cover 40 move forward upon being tilted by the tilt mechanism. At this time, as shown in FIG. 15, each stepped portion 108 comes into contact with the lower portion of the extension plate portion 66 of the shield body 60 of the shield member 58 so as to press forward the lower portion of the extension plate portion 66. At this time, since the slit 69 is formed in the base end of the lower portion of the extension plate portion 66 of the shield body 60 as shown in FIG. 16, the swing plate portion 70 of the lower portion of the extension plate portion 66 easily deforms forward and moves together with the stepped portion 108 of the column cover 40 in accordance with the tilting operation of the column cover 40 as shown in FIG. 15.

In a case where the steering column 33, configured to reciprocate relative to the opening 55 by means of the telescopic mechanism, is located at the front end in a longitudinal direction, the whole part of the shield member 58 is enclosed in the column cover 40. In a case where the steering column 33 is located at the rear end in a longitudinal direction, the shield member 58 is exposed from the column cover 40.

According to the above-described embodiment, the upper portion of the opening 55 is shielded in such a manner that the shield member 58 protruding from the upper edge of the opening 55 of the instrument panel body 53 enters the column cover 40 at a position lower than the upper plate portion 105 of the column cover 40. In addition, the lower portion of the opening 55 is shielded in such a manner that the lower portion of the side surface of the side plate portion 106 of the column cover 40 is inserted into the opening 55 so as to be located on the front side of the shield member 58 in a longitudinal direction rather than the rear end thereof in a longitudinal direction. Accordingly, since it is possible to shield a gap between the column cover 40 and the opening 55 of the instrument panel body 53 so as to have a good appearance without depending on the flexibility of the elastic material, it is possible to improve the quality of commodities. In addition, since it is not necessary to combine the column cover 40 with the instrument panel body 53, it is possible to shield a gap between the column cover 40 and the opening 55 of the instrument panel body 53 at a low cost. In addition, since the shield member 58 of the instrument panel body 53 enters the column cover 40 at a position lower than the upper portion of the column cover 40, it is possible to keep an upper space on the front side of the column cover 40 in a longitudinal direction. Accordingly, it is possible to improve a degree of freedom in design for the arrangement of a display, a switch, and the like and to compactly dispose the column cover 40 by suppressing the protrusion amount of the column cover 40 from the instrument panel body 53.

Since it is not necessary to basically deform the shield body 60, it is possible to prevent the shield body 60 from being deformed or fatigue during a heat cycle.

Since a gap between the opening 55 of the instrument panel body 53 and the upper portion of the side surface of the side plate portion 106 of the column cover 40 in a transverse direction or a vertical direction is shielded by the side plate portion 65 of the shield body 60, it is possible to reliably shield the opening 55.

Since the protrusion amount of the shield member 58 from the opening 55 is set to be larger than the maximum extension distance of the steering column 33, it is possible to maintain the shielding state of the upper portion of the opening 55 even when the steering column 33 is maximally drawn out from the instrument panel body 53.

Since the side plate portion 106 of the column cover 40 moves together with the swing plate portion 70 of the shield member 58 even when the distance between the column cover 40 and the opening 55 of the instrument panel body 53 changes due to a shape of column cover 40 in accordance with the tilting operation of the column cover 40, it is possible to efficiently prevent a gap from being formed between the column cover and the opening.

Since the shield member 58 is enclosed in the column cover 40 in the state where the steering column 33 is located at the front end in a longitudinal direction even when the shield member 58 is formed as a separate member, the shield member 58 is not exposed unless the steering column 33 is drawn out, and the boundary line between the shield member 58 and the instrument panel body 53 is not noticeable. Accordingly, it is possible to maintain the continuance of the design upon moving forward the steering column 33.

Since the shield body 60 included in the shield member 58 and provided with the upper plate portion 64 protruding so as to shield the upper portion of the opening 55 and the side plate portions 65 continuously formed with the upper plate portion 64 so as to shield the side portions of the opening 55 is sandwiched between the support member 61 and the instrument panel body 53 so as to be attached to the opening 55, it is possible to prevent a gap from being formed in the boundary line between the shield member 58 and the instrument panel body 53. Accordingly, since it is possible to shield the gap between the column cover 40 and the opening 55 of the instrument panel body 53 so as to have a good appearance, it is possible to improve the quality of commodities.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An instrument panel comprising:
   a steering column having
      a column cover comprising an upper plate portion; and
   an instrument panel body having
      an opening formed therein into which the steering column is inserted, and
      a shield member which is disposed on an edge of the opening and below said upper plate portion of the column cover so as to shield a gap between the opening and the column cover,
   wherein
   the shield member protrudes from an edge of the opening so as to enter the column cover at a position lower than an upper portion of the column cover, and
   the gap between the column cover and the opening is shielded in such a manner that lower portions of side surfaces of the column cover are inserted into the opening, and are disposed on the front side of the shield member in a vehicle longitudinal direction; and
   wherein said shield member comprises an elastic body and a rigid support member configured to secure said elastic body to said instrument panel body.

2. The instrument panel according to claim 1, wherein
   the steering column is installed so as to be tilted relative to the opening, and
   the instrument panel body includes a side shielding member which shields a gap between the opening and upper portions of the side surfaces of the column cover.

3. The instrument panel according to claim 1, wherein
   a protrusion length of the shield member from the opening is set to be larger than a maximum extension length of the steering column.

4. The instrument panel according to claim 1, wherein
   the shield member includes a following portion which moves together with side portions of the column cover in accordance with a tilting operation of the column cover.

5. The instrument panel according to claim 1, wherein
   the steering column is installed so as to be reciprocated relative to the opening,
   the shield member is formed as a member separated from the instrument panel, and wherein
   the shield member is enclosed in the column cover in a case where the steering column is located at a front end in a vehicle longitudinal direction and is exposed from the column cover in a case where the steering column is located at a rear end in a vehicle longitudinal direction.

6. An instrument panel according to claim 1, wherein shield member further comprises a base plate portion extending from said elastic body; and wherein said base plate portion is secured to said instrument panel body by said rigid support member.

7. A shield member disposed in an opening, into which a steering column is inserted, of an instrument panel body so as to shield a gap between the opening and a column cover of the steering column, the shield member comprising:
   an elastic member including
      a base plate portion;
      an upper shield portion which protrudes so as to shield an upper portion of the opening, and
      side shield portions which are continuously formed with the upper shield portion so as to shield side portions of the opening; and
   a support member which sandwiches the base plate portion of the elastic member between itself and the instrument panel.

8. A shield member according to claim 7, wherein in an assembled state thereof, the elastic body is enclosed in the column cover when the steering column is located at a first position, and the elastic member is exposed from the column cover when the steering column is located in a second position.

9. An instrument panel comprising:
   a steering column having
      a column cover comprising an upper plate portion; and
   an instrument panel body having an opening formed therein into which the steering column is inserted, and comprising a swollen portion which extends inside of the column cover and is disposed below the upper plate portion of the column cover;
   a shield member which is disposed on an edge of the opening so as to shield a gap between the opening and the column cover,
   wherein:
   said shield member comprises an elastic body, and a rigid support member configured to secure said elastic body to said instrument panel body;
   the shield member protrudes from an edge of the opening so as to enter the column cover at a position lower than the upper plate portion of the column cover;
   the gap between the column cover and the opening is shielded in such a manner that lower portions of side surfaces of the column cover are inserted into the opening, and are disposed on the front side of the shield member in a vehicle longitudinal direction; and
   in an assembled state thereof, the shield member is enclosed in the column cover when the steering column is located at a first position in a vehicle longitudinal direction, and the shield member is exposed from the column cover when the steering column is located in a second position in the vehicle longitudinal direction.

10. An instrument panel according to claim 9, wherein said first position of the steering column is located frontwardly of said second position of the steering column.

\* \* \* \* \*